United States Patent [19]

Pavnica

[11] 4,454,898
[45] Jun. 19, 1984

[54] ROUTER BRACKET

[76] Inventor: Anthony J. Pavnica, 1813 Briarcliff Dr., New Lenox, Ill. 60451

[21] Appl. No.: 486,139

[22] Filed: Apr. 18, 1983

[51] Int. Cl.³ .............................................. B27C 9/00
[52] U.S. Cl. ................................... 144/1 F; 144/35 A
[58] Field of Search ...................... 144/1 R, 1 F, 35 A, 144/136 R; 83/547

[56] References Cited

U.S. PATENT DOCUMENTS 2,621,686 12/1952 Tompkins ......................... 144/35 A
4,312,391 1/1982 Snow ................................... 144/1 R
4,397,342 8/1983 North .............................. 144/251 A

*Primary Examiner*—W. D. Bray
*Assistant Examiner*—Jorji M. Griffin
*Attorney, Agent, or Firm*—Ernest Kettelson

[57] ABSTRACT

A router bracket for attaching a router to a radial arm saw or other device having adjusting and positioning mechanisms, comprising an L-shaped bracket frame wherein the horizontal leg is bolted to the drive shaft of the radial arm saw motor or corresponding element of a similar device and the vertical leg of the bracket is substantially parallel to the side wall of the motor or comparable part of a similar device. An adjustable abutting plate is positioned between the vertical leg of the bracket and the tool device to which it is connected, with a rotatable screw positioned between the said vertical leg and said adjustable abutting plate to move the latter into tight bearing relationship against a side wall portion of the tool or device to which the bracket is connected. A saddle for receiving a router therein is mounted along the vertical wall of the bracket, and separate adjusting means are provided to move the saddle and router mounted therein upwardly and downwardly along the vertical leg of bracket. The router bracket when mounted to a radial arm saw enables positioning the router in all of the working positions of the radial arm saw, plus the additional vertical adjustments possible by virtue of the separate adjustment means which is part of the bracket itself.

11 Claims, 14 Drawing Figures

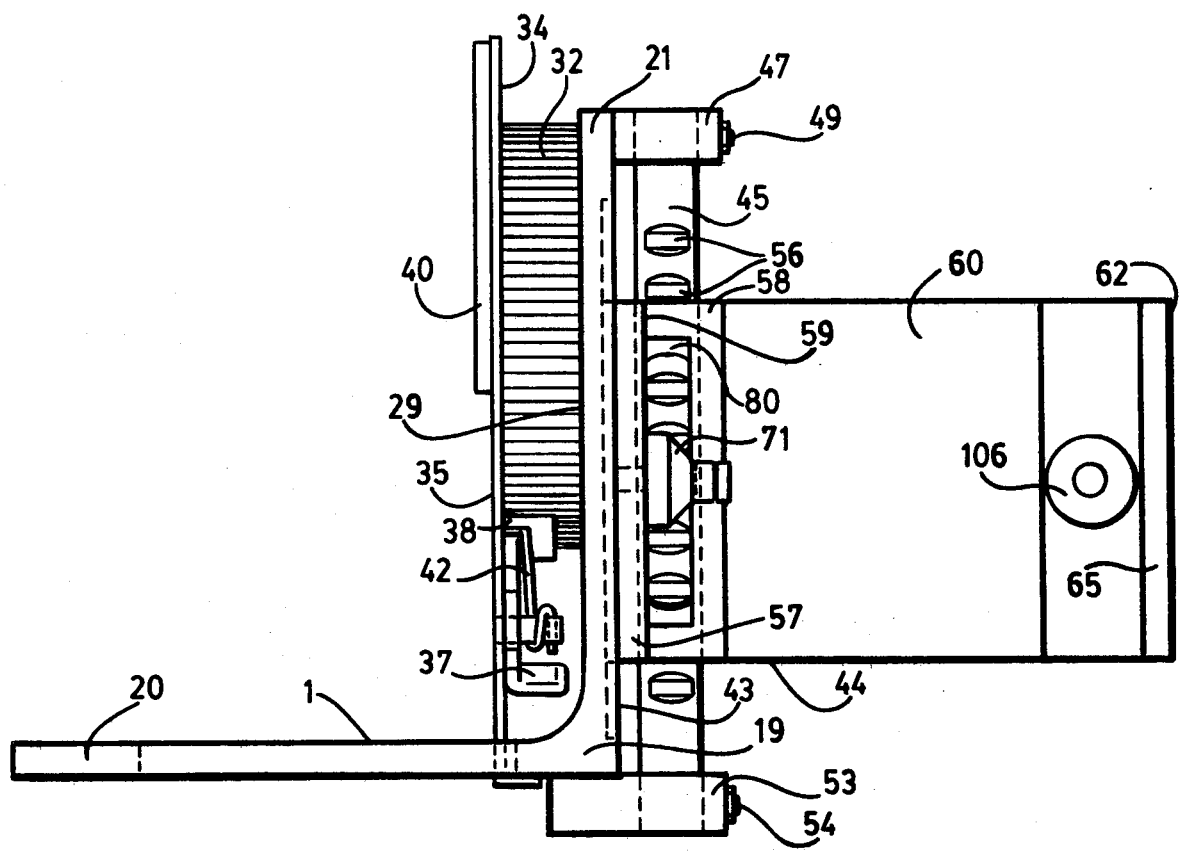
FIG. 13
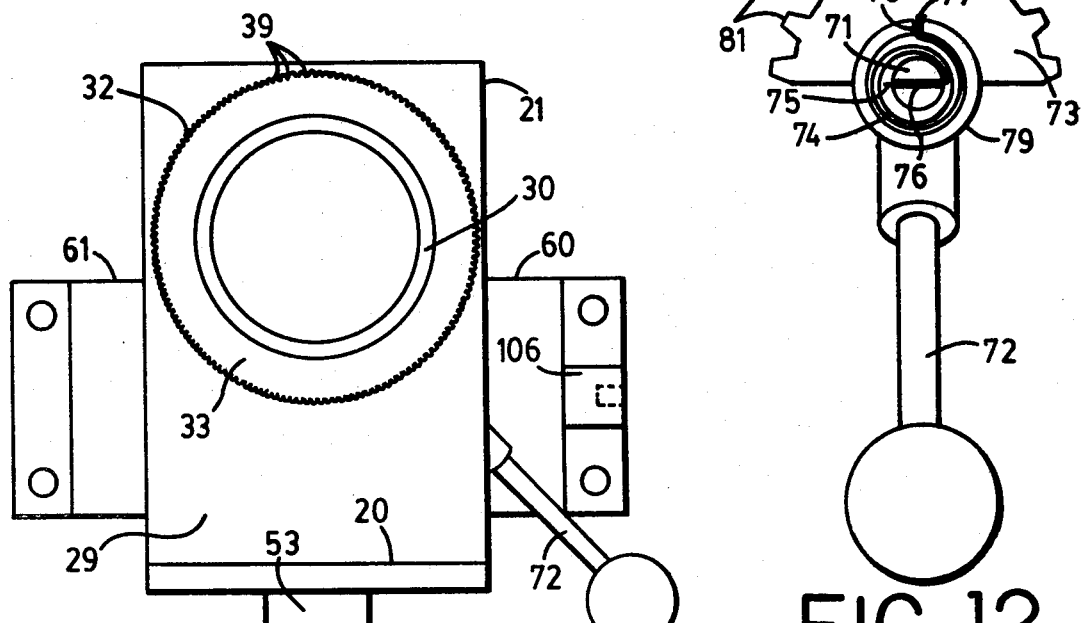
FIG. 10
FIG. 12

ROUTER BRACKET

BACKGROUND OF THE INVENTION

This invention relates to the field of mounting devices for one woodworking tool which can be connected to another woodworking or machine tool to take advantage of the positioning mechanism of the latter thereby giving it multiple use capability and in which the mounting bracket itself includes separate adjusting and positioning elements.

Radial arm saws are known to the woodworking and machine tool field comprising a work table, a vertically extending post positioned adjacent to the work table, the vertically extending post being adjustable upwardly and downwardly, a horizontally extending boom or arm projecting outwardly from the vertical post above the work table, the horizontally extending boom being rotatable for radial adjustment relative to the work table and a mounting bracket mounted on the horizontally extending boom which is movable horizontally throughout the length of the horizontally extending boom as well as being rotatable around the horizontally extending boom for angular positioning relative to the work table, the radial arm saw motor being mounted on this mounting bracket in such a way that the radial arm saw motor itself can be pivoted relative to the mounting bracket for additional angular adjustment relative to the work table. An auxiliary mounting bracket such as the router bracket in accordance with the present invention can be mounted to the side wall of the radial arm saw motor and thereby acquire all of the adjusting and positioning capabilities of the radial arm saw assembly itself.

The auxiliary or router bracket in accordance with the present invention includes the additional features of a separate back plate which can be easily and manually adjusted and tightened against the side wall of the radial arm saw motor and then locked in place to easily make a rigid and tight connection of the bracket to the radial arm saw motor. During use of the routor, if any loosening of the bracket occurs, the adjustable back plate can be immediately and manually tightened by virtue of the adjusting wheel to maintain a tight rigid connection for the router throughout its entire use without undue delay which is necessary with other prior art means of connecting an auxiliary bracket to another woodworking or machine tool. It is particularly important that the connection be maintained tight and rigid for use with a router since even a slight loosening would result in a defective slot or other formation being created by the router.

The auxiliary router bracket in accordance with this invention also includes separate adjusting means to separately adjust the router upwardly and downwardly for greater precision than possible with the upward and downward adjusting mechanism of the radial arm saw assembly itself. Also when the side wall of the radial arm saw motor is pivoted to an angled position relative to the work table, the independent vertical adjusting mechanism of the router mounting bracket enables the user to move the router into working position relative to the work piece on the work table and to withdraw the router from such working position without manipulating the separate adjusting and positioning mechanisms of the radial arm saw assembly itself.

SUMMARY OF THE INVENTION

It is an object of the invention to provide an auxiliary router mounting bracket for mounting a router to another woodworking or machine tool having adjusting and positioning mechanisms.

It is an object of the invention to provide an auxiliary router mounting bracket which includes separate adjustment and positioning elements included as part of the auxiliary mounting bracket itself.

It is an object of the invention to provide an auxiliary router mounting bracket comprising an L-shaped bracket member, the horizontal leg of which is connectible to one part of another machine tool or woodworking tool, the vertically extending leg being connectible along another portion thereof, an adjustable back plate adjacent the vertically extending leg for tightening against the corresponding portion of said woodworking or machine tool, a mounting saddle reciprocally movable along said vertically extending leg of said auxiliary mounting bracket, a router or other tool being held in said saddle, said saddle being reciprocally movable by a rack and pinion assembly connected between said reciprocally movable saddle and said vertically extending leg of said L-shaped member.

BRIEF DESCRIPTION OF THE DRAWINGS

FIG. 10 is a rear elevation view of the router bracket in accordance with this invention having the back plate component removed.

FIG. 12 is an elevation view of the spur gear component of the router bracket in accordance with this invention.

FIG. 13 is a side elevation view of the saddle assembly component of the router bracket in accordance with this invention illustrating the apertures in its hub portion which is in registration with the gear rack on the elongated shaft component of the router bracket.

DESCRIPTION OF PREFERRED EMBODIMENT

Figure 1:
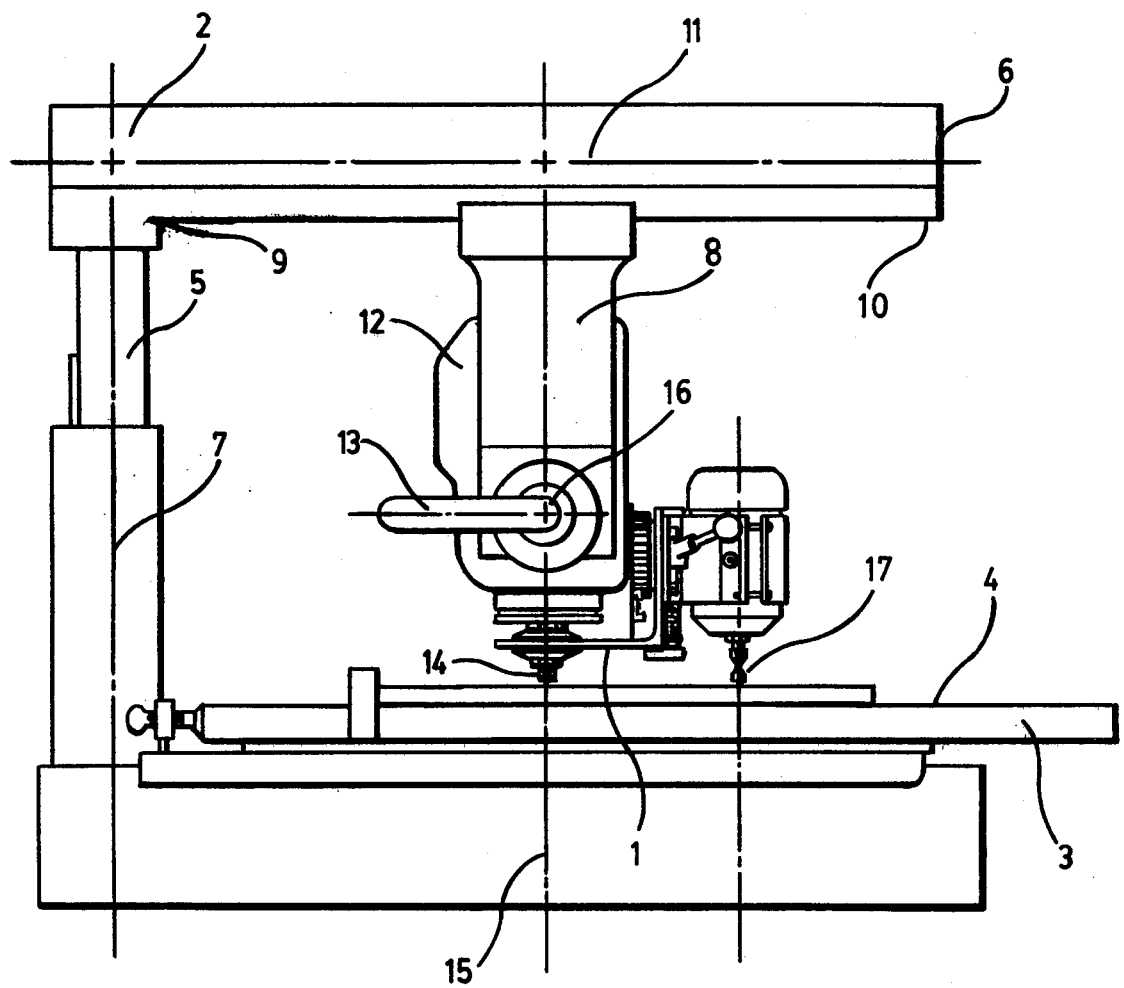
FIG. 1 is a side elevation view of a radial arm saw assembly having a router bracket in accordance with this invention secured to the side wall of the radial arm saw motor and having a router mounted in the bracket shown in its retracted position.
Figure 9:
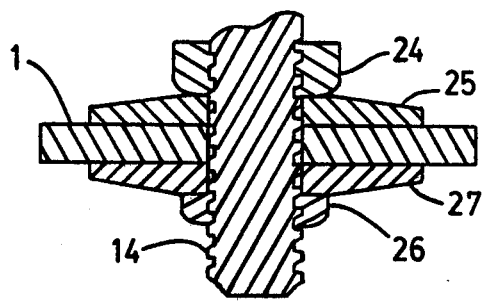
FIG. 9 is a section view of the drive shaft of the radial arm saw motor and the adapter connected thereto taken on line 9—9 of FIG. 2.
Figure 2:
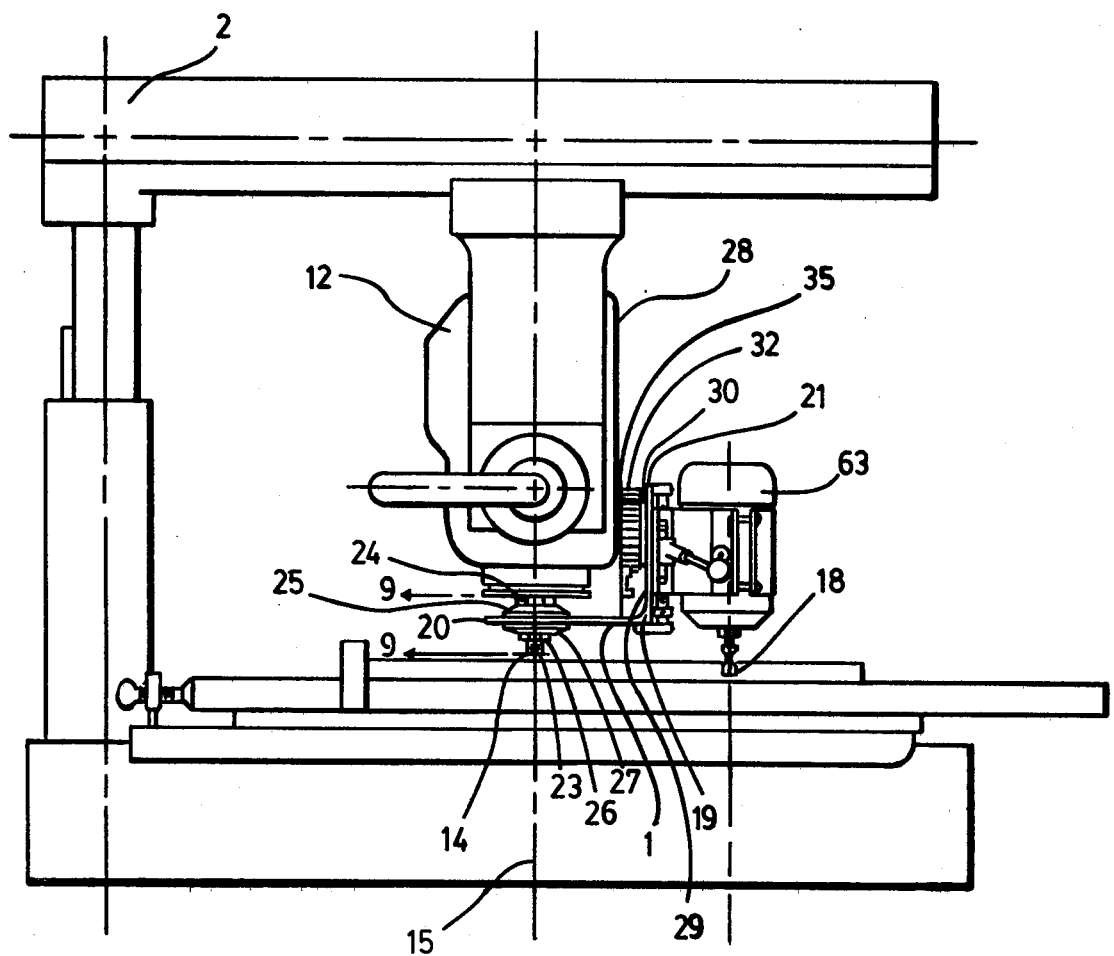
FIG. 2 is a side elevation section of a radial arm saw assembly having a router bracket in accordance with this invention secured to the side wall of the radial arm saw motor and having a router mounted in the bracket shown in its extended or working position.
Figure 11:
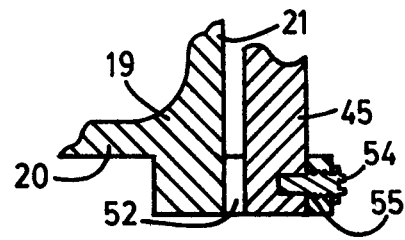
FIG. 11 is a section view taken on line 11—11 of FIG. 3.
Figure 3:
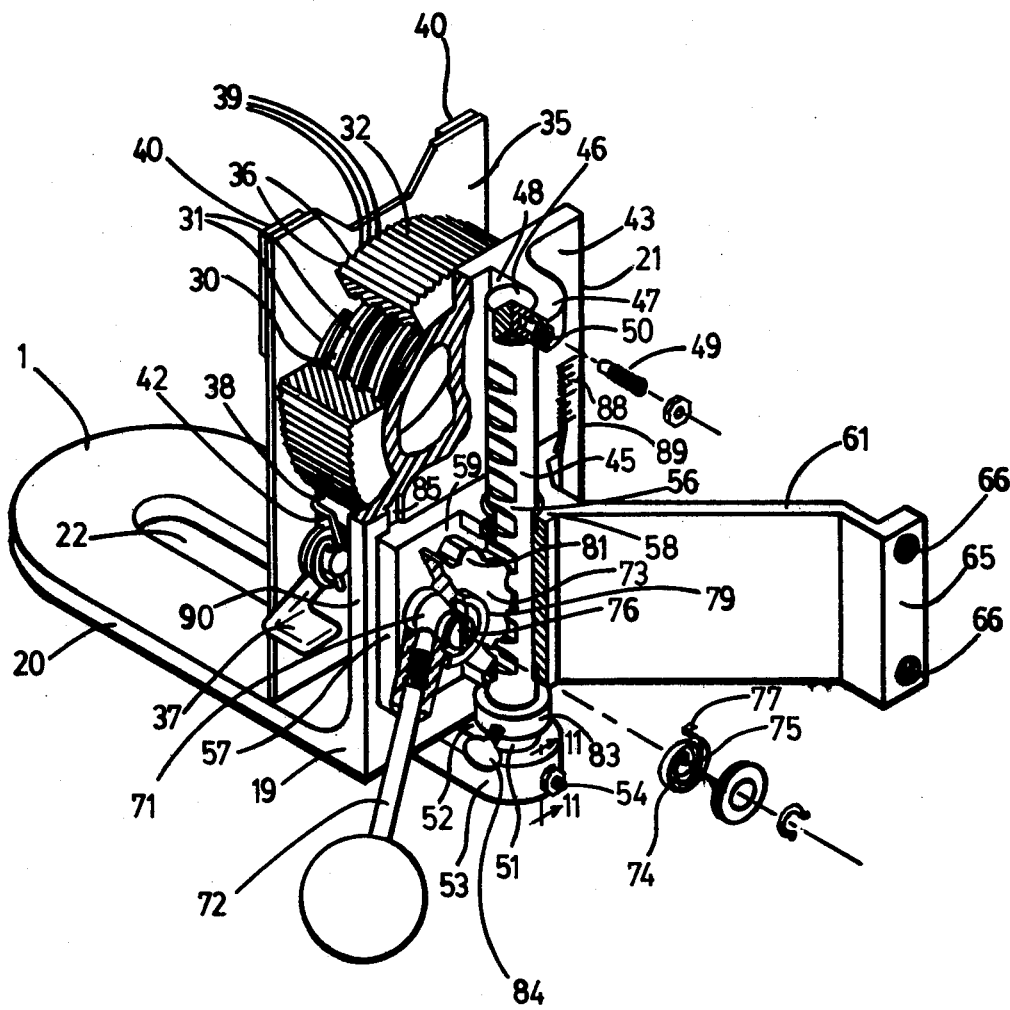
FIG. 3 is a perspective view of the router bracket in accordance with this invention with portions thereof broken away to illustrate interior parts thereof.
Figure 4:
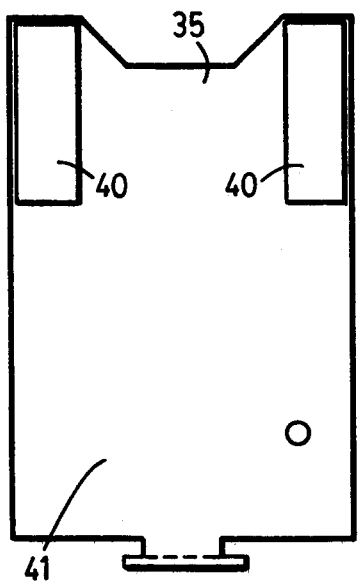
FIG. 4 is an elevation view from the front of the movable back plate component of the router bracket shown in FIG. 3.
Figure 5:
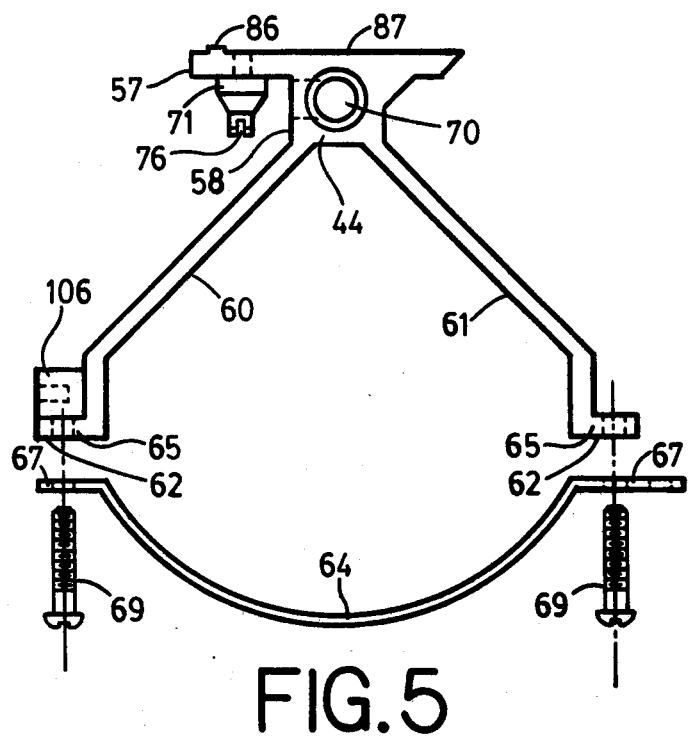
FIG. 5 is a top plan view of the saddle assembly component of the router bracket in accordance with this invention, showing the hold down bracket spaced apart and positioned for connection to the saddle assembly to hold the router motor in place.
Figure 8:
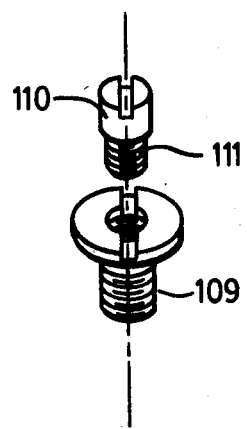
FIG. 8 is a perspective view of a pin anchor and routing pin which is insertable into the pin anchor for pin routing when the pin anchor is seated in the work table of the radial arm saw assembly.
Figure 6:
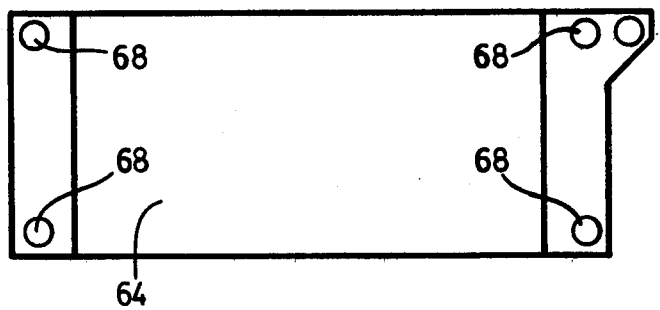
FIG. 6 is an elevation view of the hold down bracket shown in FIG. 5.
Figure 7:
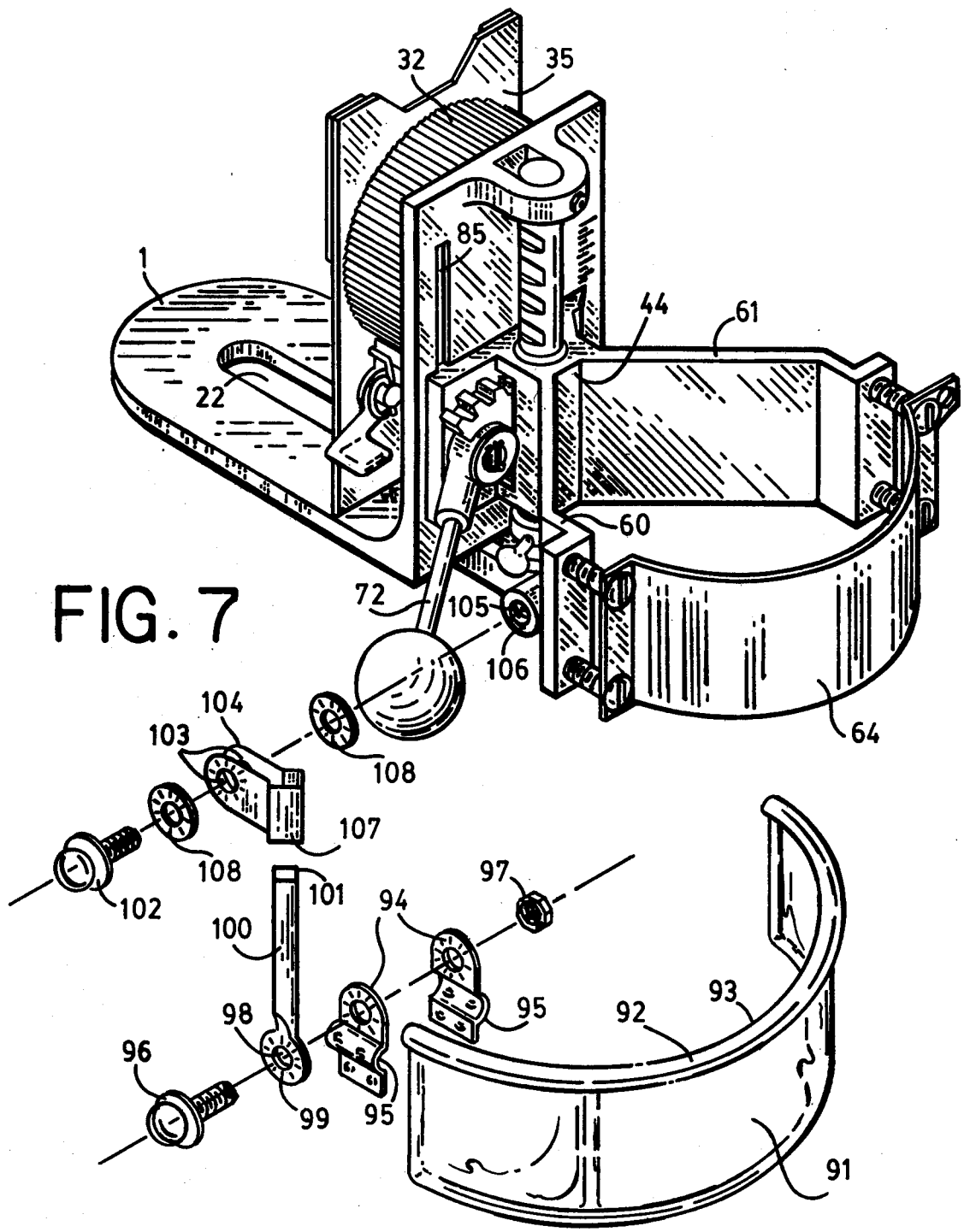
FIG. 7 is an exploded view of a safety guard assembly connectible to the router bracket in accordance with this invention.
Figure 14:
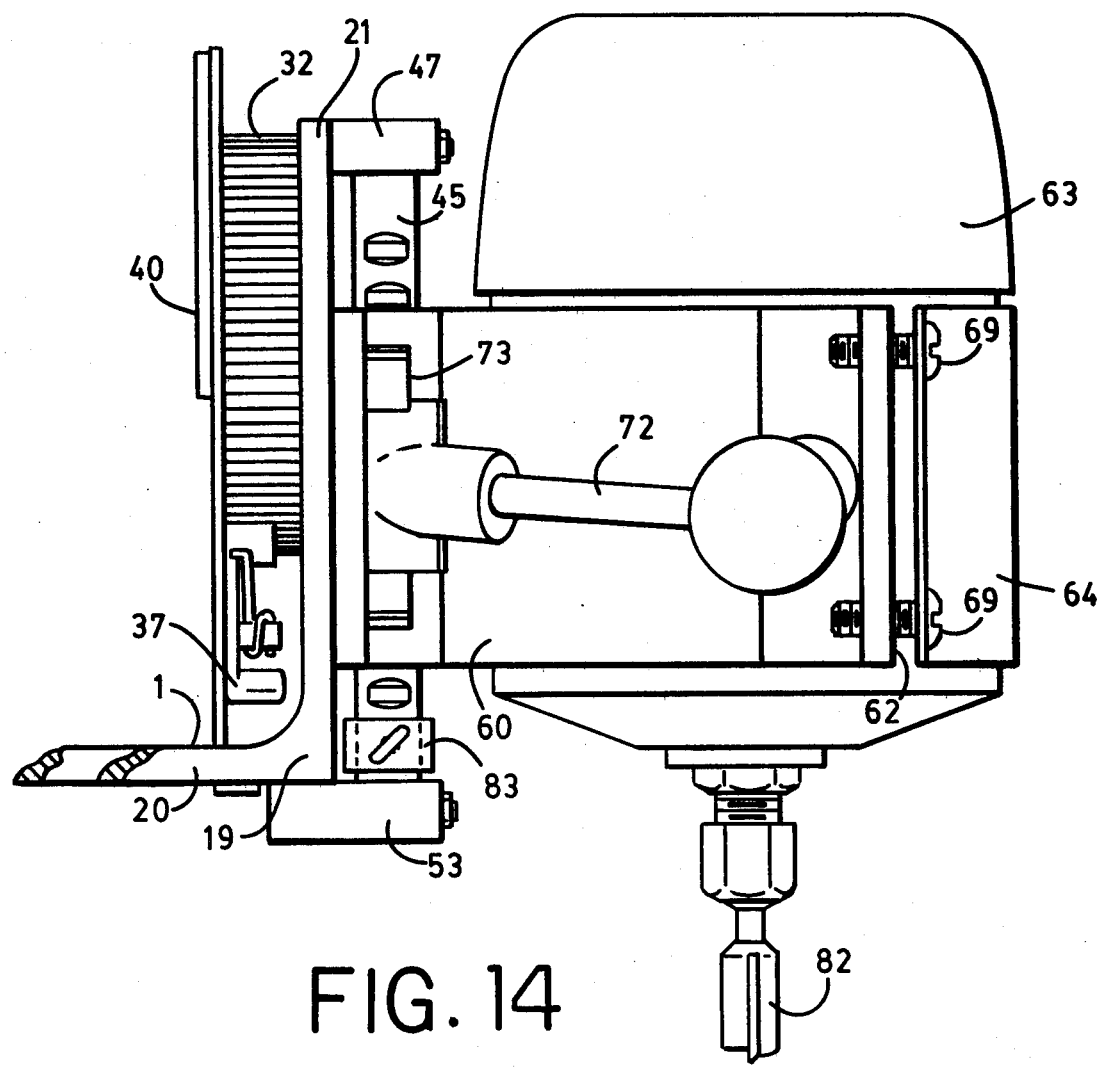
FIG. 14 is a side elevation view of a router which is mountable in the router bracket in accordance with this invention illustrating a router tool connected to the drive shaft of the router motor.

The auxiliary bracket for a router or similar tool in accordance with this invention includes an L-shaped bracket assembly 1 for connection to a radial arm saw assembly 2.

The radial arm saw assembly includes a work table 3 having a horizontally extending planar surface 4, vertically extending adjustable post 5 which is adjustable upwardly and downwardly, horizontally extending boom or arm 6 projecting outwardly from the upper portion of the vertically extending adjustable post 5, the horizontally extending boom 6 being pivotable about the axis 7 of the vertically extending post 5 for radial positioning of the horizontal boom 6 relative to the work table 3, and a radial arm saw bracket 8 which is movably mounted on the horizontally extending boom or arm 6. The radial arm saw bracket 8 is mounted for both sliding and pivoting movement on the horizontal boom 6 whereby it is slidably movable between the first end 9 of the horizontal boom 6 adjacent the vertically extending post 5 and the second opposite end 10 of the horizontal boom 6. The radial arm saw bracket 8 is pivotably mounted for pivotal movement about the axis 11 of the horizontal boom 6 for angular positioning relative to the planar surface 4 of the work table 3. A radial arm saw motor 12 is pivotably mounted on the radial arm saw bracket 8 which includes a handle 13 for pivoting the radial arm saw motor 12 thereby enabling additional angular positioning of the drive shaft 14 of the radial arm saw motor 12 relative to the planar surface 4 of the work table 3. The radial arm saw assembly 2 thereby provides angular positioning of the drive shaft 14 of the radial arm saw motor 12 or its axis 15 by rotating around the axis 11 of the horizontal boom 6 and also by rotating around the axis 16 of the radial arm saw bracket 8 around which the handle 13 pivots. The axis 16 extends in a direction which is normal to the direction in which the axis 11 extends thereby enabling positioning of the drive shaft 14 of the radial arm saw motor 12 at an angle to the planar surface 4 of the work table 3 throughout the entire 360 degree range of any planar circular area on the work table 3 and throughout substantially a 180 degree range of the lower half of any circular area in any vertical plane which normally intersects a portion of the planar surface 4 of the work table 3. The horizontal boom 6 which is pivotal on the axis 7 of the vertically extending post 5 enables radial positioning of the drive shaft 14 of the radial arm saw motor 12 relative to the planar surface 4 of the work table 3. The vertically extending post 5 being adjustable upwardly and downwardly enables adjustment of the vertical position of the drive shaft 14 relative to the planar surface 4 of the work table 3. The radial arm saw bracket 8 being slidable on the horizontal boom 6 enables horizontal positioning of the drive shaft 14 relative to the planar surface 4 of work table 3 between the area defined by the first end 9 and opposite second end 10 of the horizontally extending boom 6.

The L-shaped bracket assembly 1 in accordance with this invention provides an additional positioning and adjusting mechanism which will be described in greater detail below whereby a tool mounted in the L-shaped bracket assembly 1 can be reciprocally moved between a retracted position 17 and an extended position 18.

The L-shaped bracket assembly 1 includes an L-shaped member 19 comprising a horizontal leg 20 and a vertical leg 21. The horizontal leg 20 includes an arbor slot 22 through which the drive shaft 14 of the radial arm saw motor 12 is received for mounting the L-shaped member 19 to the radial arm saw assembly 2. An adapter 23 is connected to the drive shaft 14, the adapter 23 having external threads on which a first nut 24 is positioned on one side of the horizontal leg 20 a first washer 25 is positioned between the first nut 24 and the corresponding side of the horizontal leg 20, a second nut 26 and second washer 27 are positioned on the opposite side of the horizontal leg 20 and tightened thereagainst to hold the horizontal leg 20 tightly and securely in place on the drive shaft 14 of the radial arm saw motor 12. The length of the horizontal leg 20 is somewhat greater than the cross sectional dimension of the raidal arm saw motor 12 and the arbor slot 22 is somewhat greater than one-half the cross sectional dimension of the radial arm saw 12, or to describe it differently, somewhat greater than the distance between the drive shaft 14 or axis 15 of the radial arm saw 12 and its side wall 28. Such length of the arbor slot 22 permits horizontal movement and adjustment of the L-shaped member 19 relative to the side wall 28 of the radial arm saw motor 12 for rigidly securing the L-shaped member 19 to the radial arm saw motor 12 and for removal therefrom, as well as rigidly tightening and re-tightening when necessary of the L-shaped member 19 to the radial arm saw motor 12.

The vertical leg 21 of the L-shaped member 19 extends upwardly a sufficient distance to substantially span the side wall 28 of the radial arm saw motor 12 when the horizontal leg 20 has been secured to the adapter 23 of the drive shaft 14 of the motor 12. The width of the vertical leg 21 is preferably about equal to the cross sectional diameter of the radial arm saw motor 12. Integrally formed on the inner facing surface 29 of the vertical leg 21 is a cylindrical projection 30 which extends toward the side wall 28 of the radial arm saw motor 12 when the L-shaped member 19 is mounted in position thereon. The cylindrical projection 30 has external threads 31 formed thereon. An internally threaded adjustment wheel or locking wheel 32 is mounted on the externally threaded cylindrical projection 30 in threaded engagement therewith. The adjustment wheel 32 is of relatively large circumference having a relatively broad bearing surface 33 facing a corresponding bearing surface 34 of an adjustable back plate 35. The adjustment wheel 32 includes laterally extending ribs 36 around its circumference. A latch member 37 is mounted on the back plate 35 having a detente member 38 which seats in a slot 39 between corresponding ribs 36 around the circumference of the adjustment wheel 32 to lock the adjustment wheel 32 in a desired position. the adjustable back plate 35 is interposed between the side wall 28 of the radial arm saw motor 12 and the bearing surface 33 of the adjustment wheel 32. A pair of resilient bumper pads 40 are secured to the surface 41 of the back plate 35 which faces the side wall 28 of the radial arm saw motor 12. When the horizontal leg 20 of L-shaped member 19 is connected to the drive shaft 14 of the radial arm saw motor 12 as described above and before the second nut 26 has been tightened, the adjustment wheel 32 is rotated in threaded engagement on the cylindrical projection 30 in the direction which moves the adjustable back plate 35 which is in bearing engagement against the adjustment wheel 32 in the direction toward the side wall 28 of the radial arm saw motor 12. The second nut 26 is then tightened to rigidly secure the horizontal leg 20 of L-shaped member 19 to the drive shaft 14 of the radial arm saw motor 12. The adjustment wheel 32 is then rotated further to move the adjustable back plate 35 tightly against the side wall 28 of the radial arm saw motor 12. A leaf spring 42 biases the detente member of latch member 37 into a corresponding slot 39 in the circumference of the adjustment wheel 32 to hold the adjustment wheel 32 in place thereby also holding the adjustable back plate 35 tightly in place against the side wall 28 of the radial arm saw motor 12. During use, the back plate 35 may become loosened through vibrations and the like whereupon the adjustment wheel 32 can be immediately rotated in the tightening direction to keep the back plate 35 rigidly tightened against the side wall 28 of the radial arm saw motor 12. It is not necessary to loosen the nut 26 which holds the horizonal leg 20 rigidly to the drive shaft 14 of the radial arm saw motor 12.

The outwardly facing surface 43 of the vertical leg 21 of the L-shaped member 19 has a reciprocally adjustable saddle assembly 44 positioned thereon for reciprocal movement between said retracted position 17 and said extended position 18. A vertically extending shaft 45 is mounted in slightly spaced apart relationship along the outwadly facing surface 43 of the vertical leg 21. The upper end 46 of the vertically extending shaft is held in place by an integrally formed projection 47 having a central recess 48 in which the upper end 46 of the vertically extending shaft 45 is received. A set screw 49 extends through an internally threaded bore 50 which extends through the projection 47 for tightening against the portion of the vertically extending shaft 45 which extends into the recess 48 of the integrally formed projection 47. The vertically extending shaft 45 extends throughout the entire length of the vertical leg 21 of L-shaped member 19. Its lower end 51 is received in a recess 52 of a projection 53 which extends outwardly from the outwardly facing surface 43 of vertical leg 21 a distance corresponding to the integrally formed projection 47 at the upper end of the vertical leg 21. A set screw 54 extends through an internally threaded bore 55 of the projection 53 at the lower end of the vertical leg 21 to bear against the lower end 51 of the vertically extending shaft 45. The vertically extending shaft 45 has a gear rack 56 formed along one side thereof to mesh with a corresponding boom or spur gear described later hereinbelow for movement of the saddle assembly 44 between the retracted position 17 and extended position 18.

The saddle assembly 44 comprises a base portion 57, a vertically extending hub portion 58 extending outwardly from the outer surface 59 of the base portion and a pair of diagonally extending arms 60 and 61 which extend outwardly from the hub portion 58. The outer ends 62 of the diagonally extending arms 60 and 61 are spaced apart a distance corresponding to the cross sectional diameter of a router motor 63 which is to be mounted and held between said diagonally extending arms 60 and 61. A semi-circular hold down bracket 64 is provided to extend around the outer half of the router motor 63 for holding it tightly in position between the diagonally extending arms 60 and 61. The diagonally extending arms 60 and 61 include laterally extending flanges 65, each having a pair of internally threaded holes 66 through the flanges 65. The hold down bracket 64 includes corresponding laterally extending flanges 67 which are aligned with the laterally extending flanges 65 of the diagonally extending arms 60 and 61 when in place for securing the router motor 63 to the saddle assembly 44. The corresponding flanges 67 of the hold down bracket include apertures 68 which are in registration with the internally threaded holes 66 of the laterally extending flanges 65 of the arms 60 and 61, and bolts 69 are placed through such apertures 68 for threaded engagement with the respective internally threaded holes 66 of the flanges 65 of the diagonally extending arms 60 and 61. The bolts 69 are tightened to draw the hold down bracket 64 tightly against the side wall of the router motor 63, the opposite side wall portions of which bear against the inwardly facing surfaces of the diagonally extending arms 60 and 61.

The hub portion 58 has a central bore 70 throughout, and through which the vertically extending shaft 45 extends. The saddle assembly 44 slides reciprocally on the vertically extending shaft 45 between the retracted position 17 and the extended position 18. A pivot shaft 71 extends outwardly from the outer surface 59 of the base portion 57 of the saddle assembly 44 to which an operating lever 72 is connected and which extends outwardly from its connection point to the pivot shaft 71 at a diagonal thereto. A pinion or spur gear 73 is rotatably mounted on the pivot shaft 71 and connected thereto by a return spring 74 which has one end 75 connected to a slot 76 in the end of the pivot shaft 71 and the other end 77 connected to a corresponding slot 78 in the hub 79 of the spur gear 73. The body of the hub portion 58 of the saddle assembly 44 has an aperture 80 in registration with the gear rack 56 formed along the side wall of the vertically extending shaft 45. The gear teeth 81 of the spur gear 73 project through the aperture 80 to mesh with the teeth of the gear rack 56. Thus, when the operating lever 72 is moved upwardly, the spur gear 73 is rotated in a direction to move the saddle assembly 44 upwardly along the vertically extending shaft 45 toward the retracted position 17. When the operating lever 72 is moved downwardly, the spur gear 73 is rotated in the direction which moves the saddle assembly 44 downwardly toward the extended position 18 which may also be called the working position wherein the rotating tool 82 connected to the drive shaft of the router motor 63 is in its working position in contact with a work piece lying on the work table 3.

An annular collar 83 is mounted on the vertically extending shaft 45 below the saddle assembly 44, and the annular collar 83 is slidable on the vertically extending shaft 45 to whatever position desired as a stop position below which the saddle assembly cannot be moved to limit the depth of the rotating router tool 82 in the work piece. The annular collar 83 has a thumb screw 84 threaded therethrough to bear against the vertically extending shaft 45 when tightened to hold the annular collar 83 in the desired stop position. The outwardly facing surface 43 of the vertical leg 21 of the L-shaped member 19 includes a vertically extending guide slot 85 which extends for substantially the length of the vertical leg 21. A corresponding elongated guide member 86 is formed on the inwardly facing surface 87 of the base portion 57 of saddle assembly 44, the guide member 86 being seated in the guide slot 85 when the saddle assembly 44 is mounted for reciprocal movement on the vertically extending shaft 45.

The outwardly facing surface 43 of vertical leg 21 includes a vertically extending scale of measurements 88 marked thereon along its side edge 89. The elongated guide slot 85 is formed adjacent the opposite side edge 90 of vertically extending leg 21 of the L-shaped member 19.

A safety guard 91 comprising a semi-circular strip of clear plastic is mounted to the saddle assembly 44 and positioned to face the rotating router tool 82 thereby serving as a safety guard for the user of the tool. The semi-circular safety guard 91 includes an arcuately shaped lip 92 which is turned outwardly along the entire length of the upper edge 93 of the safety guard 91. A pair of lock sleeves 94 having arcuately shaped projections 95 are provided to grip the arcuately shaped lip 92 of the safety guard 91 and thereby hold the safety guard 91 in a desired position. The lock sleeves 94 are tightened together by a thumb screw 96 and corresponding nut 97 which extends through the apertures in the lock sleeves 94, and which also extends through an aperture 98 in the end 99 of a depth setting rod 100 whose other end 101 is connected to the saddle assembly 44. This connection is made by another thumb screw 102 which extends through the apertures 103 of a lock sleeve 104, the thumb screw 102 being threadedly seated in the internally threaded bore 105 of a boss 106 integrally formed along one side of the outer end 62 of diagonally extending arm 60. The lock sleeve 104 includes a sleeve portion 107 which receives the shank of the depth setting rod 100. When the thumb screw is tightened, lock washers 108 on each side of the lock sleeve 104 compress the arms of the lock sleeve 104 together thereby tightly gripping the shank of the depth setting rod 100 received therein. The safety guard is thus held securely in its desired position relative to the working end of the router. The depth of the safety guard 91 may be adjusted vertically by loosening the thumb screw 102 and sliding the shank of depth setting rod 100 up or down and thereafter re-tightening the thumb screw 102. The position of the safety guard 91 may also be adjusted to different arcuate or circumferential positions relative to the rotating router tool 82 by loosening the thumb screw 96 whereby the arcuately shaped lip of the safety guard 91 can slide within the arcuately shaped projections 95 of the lock sleeves 94 to any desired position whereupon the thumb screw 96 is again tightened to securely hold the safety guard 91 in that desired arcuate or circumferential position.

For pin routing, a pin anchor 109 having an internally threaded bore can be seated in the work piece 3 and a routing pin 110 having an externally threaded shank 111 can be screwed into the internally threaded bore of the pin anchor 109.

To use the invention as described herein, the horizontal leg 20 is secured to the drive shaft 14 of the radial arm saw motor 12 by placing the adapter 23 for the drive shaft 14 through the arbor slot 22 and thereafter tightening the second nut 26 and second washer 27 on one side of the horizontal leg 20 against the first washer 25 and first nut 24 on the other side of the horizontal leg 20. The adjustable back plate 35 is then moved rearwardly toward the side wall 28 of the radial arm saw motor 12 by rotating the internally threaded adjustment wheel 32 on the externally threaded cylindrical projection 30 in the direction which moves the back plate 35 toward the side wall 28 of the radial arm saw motor 12 until the back plate 35 bears tightly against the radial arm saw motor side wall 28. The latch member 37 thereupon seats in one of the slots 39 of the adjustment wheel 32 holding it securely locked in that position. The router motor is then mounted in the saddle assembly 44 by placing it between the diagonally extending arms 60 and 61 and bolting the hold down bracket 64 around the outer side wall portion of the router motor 63. The bolts 69 are tightened until the router motor is held tightly in place within the saddle assembly 44.

The annular collar 83 is then moved on the vertically extending shaft 45 to whatever stop position is desired after which the thumb screw 84 is tightened against the shaft 85 to hold the annular collar 83 securely in that position. The lower edge of the hub portion 58 of the saddle assembly 44 will abut against the annular collar 83 thereby limiting the movement of the saddle assembly 44 in the downward direction toward the extended or working position.

The router is now connected to the radial arm saw assembly and ready for operation. The position of the rotating router tool 82 relative to a work piece placed on the work table 3 can be positioned at virtually any work position desired by virtue of the positioning mechanisms of the radial arm saw assembly 2. The vertically extending adjustable post 5 can be moved upwardly or downwardly to position the rotating router tool 82 at any vertical position desired relative to the work piece on the work table 3. The horizontally extending boom or arm 6 can be pivoted about the axis 7 of the vertically extending post 5 to position the rotating router tool 82 at any desired radial position relative to a work piece on the work table 3. The radial arm saw bracket 8 can slide horizontally along the boom 6 between its first end 9 and its opposite second end 10 to position the rotating router tool 82 at any desired point horizontally throughout the distance spanned by these two ends 9 and 10 of the boom 6. The radial arm saw bracket 8 can also be pivoted or rotated about the axis 11 of the horizontal boom thereby positioning the rotating router tool 82 at a wide variety of angular positions relative to the planar surface 4 of the work table 3 and of the work piece thereon. The radial arm saw motor can furthermore be pivoted on an axis 15 which is perpendicular to or normal to the axis 11 of the horizontal boom 6, thereby positioning the rotating route tool 82 in a number of different angular positions relative to the planar surface of the work table 3 and of a work piece mounted thereon. The operating lever 72 of the L-shaped bracket assembly 1 can furthermore move the rotating router tool 82 reciprocally between a retracted position 17 and an extended position 18 or working position wherein the rotating router tool 82 is in routing contact with a work piece for forming a slot therein of a desired cross section or a molding or edging of the work piece of a desired configuration and the like.

During operation of the router, if as a result of vibration the L-shaped bracket assembly begins to loosen in its connection to the radial arm saw motor, the adjustment wheel 32 may simply be rotated in the tightening direction to tighten the back plate 35 against the side wall 28 of the radial arm saw motor 12. The latch member 37 holds the adjustment wheel 32 in that re-tightened position and the user can again continue with his routing operation. A number of different routing operations can be performed by use of the L-shaped bracket assembly in accordance with this invention connected to the radial arm saw assembly as herein described which could not be performed by other ways of using the router heretofore known to the prior art. Furthermore, a single routing tool 82 can be used to make slots and grooves of different configuration by use of this invention which heretofore would have required different types of routing tool bits. For example, the same routing tool bit having two opposed flat faces can be used to make a slot or groove in a work piece of square cross section as well as of "V" cross section, plus arcuate cross section and even parabolic cross section by use of this invention. In other ways of using a router heretofore known to the prior art, different router tool bits would be required to make grooves or slots of these cross sectional configurations.

I claim:

1. A tool mounting bracket for mounting a first tool to a device having adjusting and positioning mechanisms, comprising connecting means to connect said tool mounting bracket to said device, said connecting means including a first plate member, a second plate member extending angularly from said first plate member, first plate securing means to rigidly secure said first plate member to said device, said tool mounting bracket including an adjustable abutting member positioned in operating relationship with said second plate member, operating means to move said abutting member into tightened abutting relationship against said device, wherein said operating means includes a rotatable screw assembly positioned between said second plate member and said abutting member to move said abutting member toward said device and into tight bearing relationship thereagainst.

2. A tool mounting bracket as set forth in claim 1, wherein said adjustable abutment means includes latch means to lock said rotatable screw assembly in a fixed position when it has moved said abutting member into tight bearing relationship against said device.

3. A tool mounting bracket as set forth in claim 2, wherein said first tool is a router and said device is a radial arm saw assembly, including said radial arm saw assembly, said radial arm saw assembly including a radial arm saw motor having a drive shaft extending therefrom mounted as part of said assembly, said first plate securing means to rigidly secure said first plate member to said drive shaft including a securing device secured to said drive shaft to rigidly hold said first plate member to said drive shaft of said radial arm saw motor.

4. A tool mounting bracket as set forth in claim 3, including a supporting portion of said radial arm saw assembly for said abutting member to move into tight bearing relationship against, wherein said supporting portion of said radial arm saw assembly is a side wall portion of said radial arm saw motor, said second plate member of said tool mounting bracket extends substantially parallel to said side wall portion of said radial arm saw motor when said first plate member has been rigidly secured to said drive shaft of said radial arm saw motor, said abutting member being positioned between said second plate member and said side wall portion of said radial arm saw motor and being movable therebetween into tight bearing relationship against said side wall portion of said radial arm saw motor when said first plate member has been rigidly secured to said drive shaft thereof.

5. A tool mounting bracket as set forth in claim 4, wherein said rotatable screw assembly includes a threaded hub projecting from said second plate member toward said abutting member, a correspondingly threaded rotatable member mounted on said hub and threadedly engaged therewith, said rotatable member including a bearing surface facing said abutting member for bearing contact thereagainst to move said abutting member toward and into tight abutting relationship against said side wall portion of said radial arm saw motor.

6. A tool mounting bracket as set forth in claim 1, including separate additional adjusting and positioning means to additionally position and adjust said first tool mounted therein relative to a work piece, wherein said separate additional adjusting and positioning means of said tool mounting bracket includes an elongated wall portion of said bracket, a carriage mounted along said elongated wall portion for reciprocal movement between an extended position and a retracted position, an operating member to move said carriage between said extended position and said retracted position, said first tool being mounted in said carriage.

7. A tool mounting bracket as set forth in claim 4, a carriage assembly positioned along one side of said second plate member oppositely from the side thereof facing said abutting member, said carriage assembly including an elongated shaft mounted parallel to and spaced apart from said one side of said second plate, a gear rack formed along the side wall of said elongated shaft, a reciprocally movable saddle mounted on said elongated shaft for reciprocal movement between an extended position and a retracted position, said saddle including a pair of extending arms to receive and hold said first tool therebetween, said saddle including a hub portion having a bore therethrough to receive said elongated shaft through said central bore for reciprocal movement of said saddle relative to said elongated shaft, an aperture through said hub portion in registration with said gear rack on said elongated shaft, a spur gear mounted for meshed engagement with said gear rack on said elongated shaft, and an operating member connected to said spur gear to enable a user to rotate said spur gear in mesh with said gear rack on said elongated shaft to move said saddle and said first tool held therein between said extended and said retracted positions.

8. A tool mounting bracket as set forth in claim 7, wherein said one side of said second plate member includes an elongated guide slot formed therein substantially parallel to said elongated shaft, said carriage assembly including a corresponding guide member receivable in said guide slot to guide said saddle in its said reciprocal movement between said extended and said retracted positions.

9. A tool mounting bracket as set forth in claim 7, wherein said one side of said second plate member includes a scale of measurements marked thereon adjacent said movable saddle to a particular preselected location between said extended and retracted positions.

10. A tool mounting bracket as set forth in claim 7, including an annular collar on said elongated shaft below said saddle to serve as an abutment stop and prevent further movement of said saddle toward the extended position, and means to hold said annular collar at any desired stop location on said elongated shaft.

11. A tool mounting bracket as set forth in claim 7, including a safety shield positioned adjacent the working portion of said first tool mounted between said pair of arms of said saddle.

* * * * *